Patented Dec. 25, 1934

1,985,602

UNITED STATES PATENT OFFICE 1,985,602

NONDYEING SULPHURIZED PHENOL

Frederick B. Downing, Carneys Point, N. J., Richard G. Clarkson, Wilmington, Del., and Chester W. Hannum, Chicago, Ill., assignors to E. I. du Pont de Nemours & Company, Wilmington, Del., a corporation of Delaware No Drawing. Application November 15, 1932, Serial No. 642,760

8 Claims. (Cl. 260—20)

This invention relates to a process for producing sulphurized derivatives of phenols and more particularly refers to a process of producing sulphurized phenols which do not discolor fabrics.

It has heretofore been known that the products produced by treating alkali phenolates with sulphur at elevated temperatures are especially advantageous in fixing basic dyes upon cotton. However, this advantage was decreased to a great extent because of the fact that the sulphurized phenols imparted a yellow stain to the cotton cloth upon impregnation. In order to avoid this disadvantage it has been proposed to use varying amounts of alkali. The use of a smaller amount of alkali than that required to convert the phenol to phenolate did not eliminate the difficulty but instead introduced new difficulties, since the free phenol, left after the reaction between the alkali and the phenol, rapidly corroded ordinary plant equipment and produced products which were very dark in color. This necessitated the use of glass lined, alloy steel, or other expensive equipment. Where a higher proportion of alkali to phenol was used the corrosion was correspondingly decreased but the product stained cotton material on which it was impregnated, almost as badly as if it were made by the original process.

It is an object of this invention to provide a method for producing a non-dyeing sulphurized derivative of phenol which will not stain cotton or other textile material and which does not require expensive equipment. Additional objects will appear hereinafter.

These objects are accomplished by the present invention wherein an amount of sulphur insufficient to react with all the phenol present is used, the excess free phenol being removed by suitable means.

The invention may be more fully understood by reference to the following illustrative examples:

Example 1

A mixture of 4 moles of phenol (376 g.) and 1 mole (40 g.) of powdered sodium hydroxide was heated to 180° C., at which temperature water was evolved and sodium phenolate formed. To the molten mass was added, little by little, 5 atoms (160 g.) of sulphur and the whole heated at 182° C. with agitation under a reflux condenser until the evolution of hydrogen sulphide had ceased. This took about 15 hours. The reflux condenser was removed and superheated steam was then passed through the molten mass until no more phenol passed over. The reaction mixture was then cooled, broken up and ground to a fine powder. In this form it was a very light gray in color. When dissolved in water with the aid of a little soda ash it gave a light greenish-brown solution. Cloth treated with such a solution exhibited great affinity for basic dyes and gave much brighter dyeings than when mordanted with sulphurized phenol prepared in other ways.

Example 2

A mixture of 1 mole (122 g.) of crude xylenol and 3 moles (282 g.) of phenol was treated with 1 mole (40 g.) of powdered sodium hydroxide and was then heated to 180° C. to remove water. 5 atoms (160 g.) of sulphur were added and the preparation continued as in Example 1. After the completion of the reaction, the mixture was vacuum distilled to remove excess phenol. The product, after cooling and grinding, was a reddish powder, soluble in aqueous alkalies. It possessed the power of fixing basic colors in a high degree.

Example 3

A mixture of ½ mole (54 g.) of o-cresol and 3½ moles of phenol (329 g.) were heated together with 1 mole (40 g.) of sodium hydroxide and 5 atoms (160 g.) of sulphur as described in the previous examples. Excess phenol was removed by steam distillation as given in Example 1. The cooled product was ground to a pale pink powder which was soluble in aqueous alkali and possessed the power of fixing basic colors.

It is to be understood that other derivatives and homologues of phenol than those mentioned in the above examples may be used without departing from the scope of the present invention. Among these derivatives may be mentioned alkyl, halogen, alkoxy, and nitro substituted phenols. In carrying out the process of the present invention the derivatives of phenol may be used separately or they may be mixed together in any desired proportion.

In general, any of the well known alkalies may be substituted for sodium hydroxide in practicing the present invention. A few examples of alkalies falling within this class are potassium, barium, lithium, and strontium hydroxides. It is also to be understood that the amount of alkali used may be varied within rather wide limits. For instance, merely enough alkali may be added to facilitate sulphurization of the phenol. It is preferable, however, to maintain the molecular proportion of alkali to phenol within the range of about one-fifth to about one-half.

As the atomic proportion of sulphur to phenol $$\frac{\text{(atoms sulphur)}}{\text{(moles phenol)}}$$

was decreased below 1.5 a marked improvement in color took place. When this proportion dropped below 0.9 it was found that the color no longer became lighter, and the yield of sulphurized product had decreased considerably. Consequently, in order to maintain the maximum yield and at the same time produce a product which does not stain cotton or other textile fabrics, the ratio between 0.9 and 1.3 is preferred. However, if a higher yield is desired the upper limit may be increased slightly without imparting a too noticeable stain to the material. This preferred range of 0.9 to 1.3 may be somewhat increased or decreased depending upon the particular phenol or phenolic compounds which are being sulphurized, without departing from the scope of the present invention.

The free phenol may be removed at the end of the reaction by any suitable means, such as ordinary distillation, vacuum distillation or steam distillation.

It is believed that the reason for the excellent results accomplished by the present invention in comparison with results formerly produced is that the presence of a greater amount of sulphur than that specified herein causes the formation of more highly sulphurized derivatives which impart objectionable colors to the impregnated material. By the herein described invention the formation of these more highly sulphurized derivatives is either entirely prevented or greatly decreased, resulting in the production of a sulphurized derivative which imparts no stain to the textile material.

The process described herein produces sulphurized derivatives of phenol which are very useful as mordants for basic dyes and which in addition do not stain the mordanted material. These products are also useful when treated with sodium bisulphite and formaldehyde as resists for silk and wool, since they do not stain the silk and wool, as was the case when sulphurized derivatives produced by prior processes were used. The process is also highly advantageous since the use of expensive equipment is avoided.

As many apparently widely different embodiments of this invention may be made without departing from the spirit and scope thereof, it is to be understood that we do not limit ourselves to the specific embodiments thereof except as defined in the appended claims.

We claim:

1. A process for producing sulphurized derivatives of phenols which comprises reacting a monohydric phenol with an amount of sulphur insufficient to react with all the phenol present in the presence of an alkali metal hydroxide, and subsequently removing the unreacted phenol.

2. A process for producing sulphurized derivatives of phenols which comprises heating a monohydric phenol with sulphur, the atomic proportion of sulphur to phenol being not greater than 1.3:1, in the presence of an alkali metal hydroxide, and subsequently removing the unreacted phenol.

3. A process for producing sulphurized derivatives of phenols which comprises heating a monohydric phenol with sulphur, the atomic proportion of sulphur to phenol being within the range of 0.9:1 to 1.3:1, in the presence of an alkali metal hydroxide, the proportion of alkali to phenol being within the range of 0.2 to 0.5, and removing unreacted phenol.

4. A process for producing sulphurized derivatives of phenols which comprises heating a mixture of a monohydric phenol and a monohydric phenolate with sulphur, the atomic proportion of sulphur to original phenol prior to the production of phenolate being within the range of 0.9:1 to 1.3:1, and subsequently removing the unsulphurized phenol.

5. The product produced according to the process of claim 1.

6. The product produced according to the process of claim 2.

7. The product produced according to the process of claim 3.

8. The product produced according to the process of claim 4.

FREDERICK B. DOWNING.
RICHARD G. CLARKSON.
CHESTER W. HANNUM.